Figure 1:
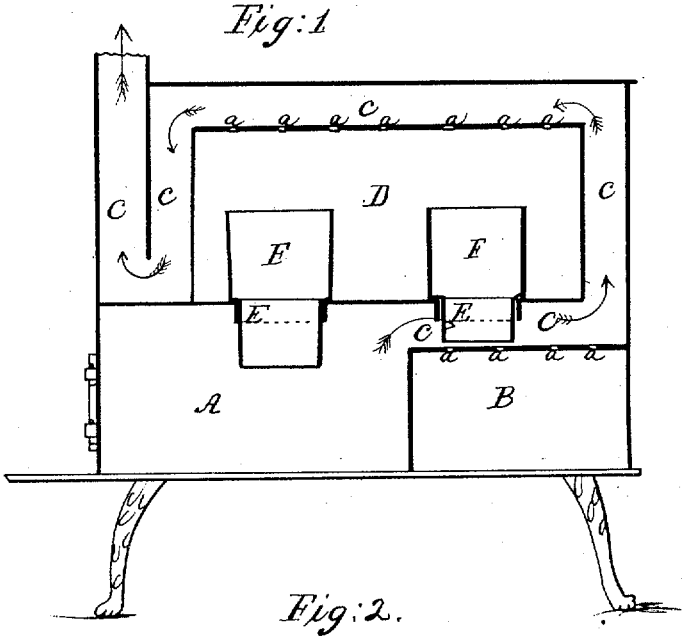
Figure 2:
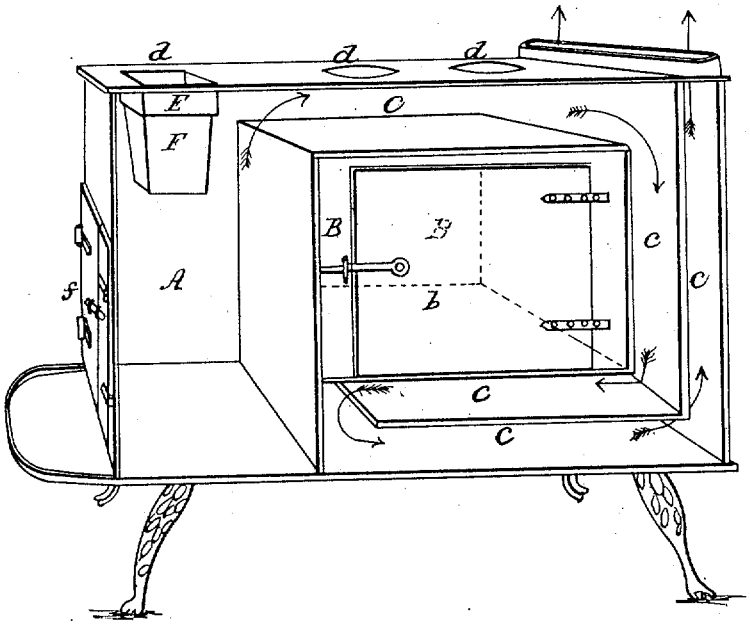

2297X

C. Postley.

Reservoir Cooking Stove.

Patented Apr. 26, 1815.

april 12, 1815 2297X

Charles Postley ——

Letters Patent dated April 26th 1815 and Re-
corded anew May, 26th. 1845 —

The Schedule referred to in these Letters Patent and making part of the same containing a description in the words of the said Charles Postley himself of his improvement in Stoves.

---

This Stove may be made either of sheet or cast iron or any other suitable materials, it consists of thirteen plates, at one end of the stove is a furnace of the width of the stove, the depth and height according to the size of the stove, say from 9 to 12 inches depth, height & width and in length the width of the stove.

The fire is made on the bottom of the plate of the stove and the remainder of the stove consists of an oven of the height of from 6 to 9 inches, above the oven is a flue leading from the furnace of 2½ inches in height, and the width of the stove, this leads to the end of the stove farthest from the furnace and then being contracted to 2 inches ascends to the top and is carried under the top plate to within 4½ inches of the other end, then descends to the plate over the furnace, and again ascends to the opening which carries of the smoke, the centre of the stove form a second oven which will be from 18 to 24 inches in length according to the size. By this construction the fire being made at one end and adjoining the plate of the bottom oven, is carried over the same and also all around the upper oven giving a more uniform heat than other stoves. Down in the furnace and also in the flue leading directly from it are openings of 5/4 inches in length and 1/4 inch in depth for receiving projecting tubs from tubes which are shewed in said openings and removed at plea-
sure, these tubes are from 9 to 18 inches long according to the
size of the Boilers, and in width and thickness to fill the
openings that are in the stove. In the top plates of the
ovens are small openings for carrying of the steam which
may arise from cooking &c. The boilers may be made
of copper tin sheet or cast iron, or any other suitable ma-
terials and of any size required the boilers for boiling cloths
may be made of wood with copper tubes, or other suitable
materials.

The stove may also be constructed thus, with 12 plates, the
furnace at one end of the stove, from 9 to 12 inches in width
and in length the width and the height of the stove, the fire
ascends to the top of the stove, and there is carried off in a
flue of 3 inches in depth and the width of the stove to with-
in 2 1/2 inches of the other end of the stove, then the flue is
contracted to 2 inches and descends to within 4 1/2 inches
of the bottom and then takes a direction along the bottom of the
oven until it arrives at the back plate of the furnace and then
returns to the farther end in a flue of 2 inches and then
ascends to the opening which carries off the smoke in a flue of 2
inches also, all the flues are of the whole width of the stove, this
leaves the middle of the stove open and is converted into an
oven by means of a door fixt on hinges and will be of any
size according to the size of the stove, say in general from 15
to 24 inches in length & from 8 to 12 inches in depth and
is surrounded with heat.

The top plate of the stove has from 2 to 3 appertures one
directly over the fire, the others between that and the further end
of the stove, in they may be placed boilers of any size the stove
will admit of; there are also openings in the furnace for receiv-
ing projecting tubes of boilers, the fire being at one end of the
stove the furnace may have folding doors and being left open

2297X shew the fire the same as a franklin stove and at the same time heat the stove &c Among many advantages which these stoves possess over others wee may enumerate the following they contain from one to two ovens and has attached to them from three to five boilers according to the size of the stove all of which may be put in operation with the same fire which heats the stove of which there may be no operation, Roasting, Baking Boiling all at the same time, and does not consume more than one half the wood that common baking does, a boiler containing from 8 to 12 quarts will boil in 15 minutes and according to the size the longer time will be required for them to Boil — and the greater advantage is that their price is within the reach of the poor in general, so as they can save the one half the fuel and keep their families more comfortable, some of those gentlemen that have them now in use say they do not consume more than one quarter of a cord of wood in a Winter month with one advantage of doing all their Cooking & Washing with the small fire.

Witnesses
Gilbert Heard
Wm. Mode

Charles Pottley

Drawing made (916 words)

Ca'd
[illegible]